United States Patent [19]

Castelas

[11] Patent Number: 4,814,202

[45] Date of Patent: Mar. 21, 1989

[54] PROCESSES FOR MANUFACTURING THIN MEMBRANES COMPOSED OF AN ORGANIC LATTICE OF TITANIUM AND SILICON OXIDES AND POWDER COMPOSED OF SUBMICRONIC GRAINS OF MIXED TITANIUM AND SILICON OXIDES

[75] Inventor: Bernard L. Castelas, Montpellier, France

[73] Assignee: Centre Meridional d'Oenologie, Clermont-L'Herault, France

[21] Appl. No.: 123,863

[22] Filed: Nov. 23, 1987

[51] Int. Cl.$^4$ .................... B05D 3/02; B05D 5/00; C04B 35/14

[52] U.S. Cl. .................. 427/226; 427/215; 427/244; 427/379; 501/133

[58] Field of Search ............. 427/226, 215, 244, 379; 501/133

[56] References Cited

U.S. PATENT DOCUMENTS

| | | | |
|---|---|---|---|
| 2,472,831 | 6/1949 | Hunter | 502/237 |
| 3,926,799 | 12/1975 | Thomas | 427/245 |
| 4,649,037 | 3/1987 | Marsh et al. | 423/338 |
| 4,687,652 | 8/1987 | Yoldas et al. | 501/128 |

FOREIGN PATENT DOCUMENTS

| | | |
|---|---|---|
| 0065863 | 5/1982 | European Pat. Off. |
| 092840 | 4/1983 | European Pat. Off. |
| 130480 | 6/1984 | European Pat. Off. |
| 0136937 | 9/1984 | European Pat. Off. |
| 0188950 | 12/1985 | European Pat. Off. |
| 1440105 | 4/1965 | France |
| 1459437 | 11/1965 | France |
| 2587231 | 9/1985 | France |

OTHER PUBLICATIONS

Technical publication Vide, "Utilization Des Procedes Sol Gel Pour L'Oblention De Couches Minces Ceramiques", vol. 40, No. 227, pp. 277–280.

Primary Examiner—William R. Dixon, Jr.
Assistant Examiner—Anthony J. Green
Attorney, Agent, or Firm—Bucknam and Archer

[57] ABSTRACT

This invention relates to processes for manufacturing thin membranes composed of an inorganic lattice of titanium and silicon oxides, wherein one or more titanium alkoxides and one or more silicon alkoxides are placed in solution in the same solvent, in order to obtain mixed titanium and silicon alkoxides; these mixed alkoxides are partially hydrolyzed by adding a basic aqueous solution having a pH of between 11 and 12; a layer of hydrolyzed solution is applied on a substrate; the particles in suspension are separated; the residual alkyl groups are eliminated by evaporation, and baking is effected at a temperature of between 700° and 1250° C.

10 Claims, No Drawings

PROCESSES FOR MANUFACTURING THIN MEMBRANES COMPOSED OF AN ORGANIC LATTICE OF TITANIUM AND SILICON OXIDES AND POWDER COMPOSED OF SUBMICRONIC GRAINS OF MIXED TITANIUM AND SILICON OXIDES

FIELD OF THE INVENTION

The present invention relates to processes for manufacturing thin membranes, composed of an inorganic lattice of titanium and silicon oxides and to submicronic powders obtained by one of the processes according to the invention.

The technical sector of the invention is that of the manufacture of porous, microporous or non-porous membranes.

BACKGROUND OF THE INVENTION

Up to the present time, there are two principal ways of manufacturing thin layers of ceramics composed of one or more metal oxides such as alumina, silica, titanium oxide, potassium oxide, etc. . . .

A first method consists of mixing very fine powders of each of the corresponding oxides in determined proportions, then in suspending them in an organic binding agent or any other binding agent so as to obtain a slip adapted to be deposited on a support in a very thin layer, before being sintered.

This first method requires careful monitoring of the granulometry of the oxide powders as well as of the physico-chemical properties of the slip.

Depending on whether or not the support on which the thin layer of slip is deposited is porous, the viscosity of the slip and its concentration of organic products (binding agents, plasticizers, surface-active agents, . . . ) must be monitored with very high precision in order to allow the physico-chemical and mechanical characteristics of the deposited layer to be perfectly reproduced.

A second method employs the sol-gel technique which leads to obtaining a sol composed of metal-organic precursors, i.e. polymers containing metal cores connected to organic groups. By an appropriate heat treatment, these polymers are decomposed to produce the corresponding metal oxides.

According to this second method, a solution is formed, composed of metal oxide hydrates or of partially hydrolyzed metal alkoxides and this solution is deposited in a thin layer on a substrate which is porous or not. This solution has well-defined viscosity and characteristics and leads, by slow drying at low temperature, to a polymer gel which is constituted by a perfectly cross-linked metal-organic lattice.

After drying, the thin layer of gel is subjected to a heat treatment which converts it into a thin membrane composed of metal oxides. This second method makes it possible to obtain membranes which are much more homogeneous and of better quality than those obtained by the first method, which is conventional with ceramists.

The processes according to the invention are allied to both methods.

The processes according to the invention enable thin membranes to be manufactured which are composed of an inorganic lattice of titanium and silicon oxides.

They make it possible to obtain either a submicronic powder composed of mixed metal oxides whose granulometry may be perfectly monitored and which makes it possible to produce a slip applicable on a support according to the first method, or a solution applicable in thin layer on a support making it possible to obtain by heat treatment a membrane whose porosity may be monitored as desired from the respective proportions of titanium and silicon.

It is an object of the invention to provide means for depositing on supports very reactive submicronic layers making it possible to obtain, by heat treatment, membranes which are microporous or not, at sintering temperatures lower than those usually required, hence a saving in baking energy and a better porosity.

SUMMARY OF THE INVENTION

The process according to the invention comprises the following successive operations of:

placing in solution in an anhydrous alcohol or in an alkane one or more titanium alkoxides and one or more silicon alkoxides in a determined ratio, so as to obtain macromolecules of mixed alkoxides of titanium and silicon;

effecting partial hydrolysis of said mixed alkoxides by adding to said solution a basic aqueous solution having a pH of between 11 and 12, with the result that a controlled nucleation is provoked, which leads to the formation of partially hydrolyzed copolymers of titanium and silicon alkoxides, which form a solution if the ratio between the number of molecules of water and the number of molecules of metal is included between 0.5 and 1 or a suspension of particles, if this ratio is included between 2 and 4;

eliminating by evaporation the residual alkyl groups by slowly heating to a temperature of between 180° and 400° C., this heat treatment being effected either on a layer of said solution applied on a substrate, or on a powder constituted by said particles in suspension after having separated them;

heating to a temperature of between 700° and 1250° C. said layer of solution or a layer of slip composed of said powder after having applied said layer on a substrate, with the result that a thin membrane is obtained on the surface of said substrate, composed of an inorganic lattice of titanium and silicon oxides.

According to the first embodiment, the process according to the invention comprises the following steps of:

hydrolyzing said solution of titanium and silicon alkoxides by adding thereto such a quantity of basic aqueous solution that the ratio between the number of molecules of water and the number of molecules of metal is included between 2 and 4, with the result that a suspension of particles of partially hydrolyzed copolymers of titanium and silicon alkoxides is obtained;

filtering said solution in order to separate the precipitate;

drying the precipitate at a temperature lower than 80° C., in order to obtain a powder;

slowly heating said powder to a temperature of between 180° and 600° C. in order to eliminate the residual alkyl groups;

mixing said powder with water containing binding agents and organic surface-active agents in order to form a slip;

applying a thin layer of said slip on a substrate;

and heating said layer to a temperature of between 750° and 1250° C., with the result that a thin membrane is obtained by sintering, composed of an inorganic lattice of titanium and silicon oxides.

According to a second embodiment, a process according to the invention comprises the following steps of:

hydrolyzing said solution of titanium and silicon alkoxides by adding thereto such a quantity of basic aqueous solution that the ratio between the number of molecules of water and the number of molecules of metal is included between 0.5 and 1, with the result that a solution of copolymers of titanium and silicon alkoxides is obtained, containing a high proportion of non-hydrolyzed alkyl groups;

applying on a substrate a thin layer of this solution;

slowly heating to a temperature of between 180° and 600° C. in order to eliminate by evaporation the residual alkyl groups;

and then heating to a temperature of between 750° and 1250° C. in order to produce by sintering a membrane composed of an inorganic lattice of titanium and silicon oxides.

The first process according to the invention makes it possible to obtain a novel product which is a very fine powder, composed of submicronic grains which all contain a mixture of silica and titanium oxide forming an inorganic lattice, with the result that all the grains have the same composition.

The invention results in means for applying on a substrate, for example on a porous ceramic filter cartridge, a thin membrane having a very uniform composition over its entire extent and of which the parameters of porosity may be adjusted by the choice of the titanium and silicon alkoxides which are mixed and by the respective proportions of these alkoxides. The more silicon is added, the lower the melting point, this therefore making it possible to lower the temperature of sintering.

By using a high proportion of silicon, of the order of 75%, entirely vitrified and dense membranes are obtained after baking, which may be used for forming protective coatings, for example against corrosion or against abrasion or as reverse osmosis membranes.

The processes according to the invention make it possible in particular to manufacture porous and/or semi-permeable membranes intended to serve as filtering surface for filter, microfiltration, ultrafiltration or reverse osmosis cartridges.

If the operation of hydrolysis by a basic aqueous solution, which is one of the essential steps of a process according to the invention, is conducted by using a fairly large proportion of water, a suspension of particles of copolymers of titanium and silicon alkoxides is obtained, which particles may be separated by filtration, then dried and then subjected to a heat treatment which eliminates by evaporation the residual alkyl groups, with the result that a very fine powder is finally obtained, composed of submicronic grains, in which each grain is composed of a metallic lattice formed by silica and titanium oxide which conserves the structure of the copolymers from which it is derived, with the result that all the grains have the same composition and the silica is therefore distributed very uniformly in the titanium oxide matrix.

This powder makes it possible to produce a slip which may be applied in very thin layer on a substrate and which enables a membrane to be obtained after baking, composed of a metallic lattice of silica and of titanium oxide having a very uniform composition in its entire thickness and extent.

This powder therefore makes it possible to produce, by the technique of application of a layer of slip, very thin porous membranes of which the parameters of porosity may be adjusted with a much greater precision than that obtained with membranes produced in conventional manner, by application on a substrate of a layer of slip obtained simply by mixing metal oxides.

A first process according to the invention is broken up into two principal phases:

During the first phase, of which the steps are explained hereinafter, a powder is formed, composed of mixed molecules of titanium and silicon oxide.

In the course of the second phase, a slip is prepared which is applied in thin layer on a support and which is then subjected to a thermal treatment of sintering.

The choice of membranes composed of mixed molecules of titanium and silicon oxides is guided by the complementary properties of these two oxides.

Titanium oxide ($TiO_2$) is known for its high chemical resistance associated with an excellent mechanical strength. It forms the matrix of the layer. On the other hand, its temperature of sintering is high, and it is advantageous to associate it with silicon oxide ($SiO_2$) which melts at lower temperature and which performs the role of flux. In addition, where it is desired to manufacture semi-permeable layers intended for reverse osmosis, the presence of silicon oxide ensures a better selective transfer thanks to its hydrophilic properties.

When the inorganic layer is intended to manufacture semi-permeable membrane for a liquid-liquid separation, the ratio between the concentrations of $TiO_2$ and of $SiO_2$ makes it possible to adjust the open porosity of the membrane. The more the ratio $[SiO_2]/[TiO_2]$ increases, the more the porosity decreases until it becomes zero when the flux $SiO_2$ makes it possible totally to vitrify the $TiO_2$ matrix, which is the case when $[SiO_2] > 75\%$.

The processes according to the invention make it possible to produce various inorganic membranes capable of solving problems of microfiltration, ultrafiltration or of reverse osmosis in accordance with the ratio $[SiO_2]/[TiO_2]$.

The granulometry of the powder of $TiO_2$ depends, in known manner, on the type of titanium alkoxide used. This granulometry makes it possible to determine the diameter of the pores of the membrane. The concentration of $SiO_2$ determines the open porosity of the membrane, i.e. the efficient porous volume.

The first step of the processes according to the invention consists in mixing in an anhydrous alcoholic solvent or in an alkane titanium and silicon alkoxides, for example tetra isopropoxy titanium and tetra ethoxy silane taken in determined proportions depending on the nature of the membrane to be manufactured.

These organo-metallic compounds form macromolecules of polymers of low molecular weight which produce chain-links between metal cores which depend on the proportions of the two alkoxides.

The alcoholic solvent is preferably constituted by the alcohol of highest degree corresponding to the two alkoxides used, for example isopropyl alcohol in the above case.

The second step of the processes according to the invention consists in partially hydrolyzing the preceding mixture by adding thereto a well determined quantity of a basic aqueous solution of which the pH is included between 11 and 12.

It is known that the metal alkoxides placed in the presence of water hydrolyze very rapidly, with the exception of silicon alkoxides which hydrolyze rapidly only in the presence of a very basic medium.

A pH is chosen for which the speed of hydrolysis of the silicon alkoxides is similar to the speed of hydrolysis of the titanium alkoxides.

In order to promote a homogeneous nucleation of the submicronic grains, the ratio between the number of molecules of water [$H_2O$] and the number of molecules of metal [M] is chosen which is included between 0.5 and 4.

If the proportion of water is not high, less than or equal to one molecule of water for one molecule of metal, the degree of hydrolysis remains moderate and a colloidal solution is obtained.

If the proportion of water is higher, of the order of 2 to 4 molecules of water per molecule of metal, a submicronic suspension of grains of polymers in the liquid phase is obtained.

Under the operational conditions set forth hereinabove, nucleation is very rapid. Depending on the type of titanium alkoxides and silicon alkoxides chosen at the start, for example tetra isopropylorthotitanate [Ti(OC$_3$H$_7$)$_4$] or tetra ethoxy orthotitanate [Ti(OC$_2$H$_5$)$_4$] on the one hand and/or tetra ethoxy silane [Si(OC$_2$H$_5$)$_4$] on the other hand, a submicronic powder may be obtained by controlled hydrolysis, constituted by perfectly spherical or pseudo-spherical grains of which the diameter is included between 10 nm and 1000 nm, each grain being composed of macromolecules of copolymers of titanium and silicon alkoxides.

At the end of the operation of nucleation by hydrolysis, the alcoholic suspension is filtered, then the precipitate is dried at a temperature less than 80° C. for a duration of the order of 24 hours. A barely hydrated powder is obtained. A thermogravimetric analysis thereof shows that, further to this drying, the ratio [$H_2$]/[M] is less than 0.4.

Hydrolysis is not total and this pulverulent powder still contains a certain quantity of alkyl groups.

A thermal treatment of the powder lasting about 4 hours at a temperature of between 180° and 600° C. makes it possible totally to eliminate by evaporation the residual alkyl groups. Finally, a powder is obtained, composed of submicronic grains, each grain being constituted by macromolecules of mixed oxides of titanium and silicon which are joined together, forming an inorganic lattice which conserves the structure of the macromolecules of the polymers of alkoxides which resulted from the hydrolysis, with the result that the silicon oxide is distributed very uniformly in the mass of the inorganic lattice, this leading to a very good uniformity of the properties of porosity of the membranes.

In order to improve homogeneity of the granulometry of the powder, the powder may be washed in a basic aqueous solution having a pH>10. The effect of such washing is to avoid the grains agglomerating together.

Once the powder, composed of mixed titanium and silicon oxide grains, is obtained by filtering, drying and heat treatment, the second phase of the first process according to the invention is carried out.

The first step of this second phase is the making of a very fluid slip which is obtained by mixing the powder with organic products which serve as binding agents, plasticizers and surface-active agents.

A liquid slip is thus obtained which may be applied on a support, so as to coat the latter or part thereof with a film of slip of which the thickness is less than 50 microns.

Due to the high reactivity of the powder and its fineness, precautions must be taken when making the slip to avoid flocculation.

Flocculation is avoided by using surface-active agents and appropriate organic binding agents for example anionic surface-active agents, and, as binding agent, either polyvinyl alcohols or polyacrylic acid resins or polyethylene glycol.

The slip obtained is a stable colloidal suspension which has a very low viscosity, less than 100 centipoises and which does not settle when it is no longer subjected to mechanical stirring. This typical property of the submicronic powders of metal oxides makes it possible to make a film deposit on porous or non-porous supports as the wetting power of the slip is considerable.

Once the support is coated with a film of slip, the film is sintered at a temperature of between 700° and 1250° C., with the result that a support, generally of ceramics, is finally obtained, which is coated with a ceramic membrane, which may be more or less porous and of which the parameters of porosity may be monitored by the choice of the initial alkoxides and by the relative proportions thereof in the initial mixture. Filter or ultra-filtration cartridges or semi-permeable or non-permeable membranes may thus be manufactured.

Examples of embodiment of the invention will be described hereinafter without any limiting character.

EXAMPLE 1

Manufacture of ceramic tangential microfiltration cartridges coated with a membrane of mixed titanium and silicon oxides Tetra ethoxy silane Si(OEt)4 and tetraisopropoxytitanate Ti(OiPr)4 are mixed in isopropyl alcohol at ambient temperature, for about one hour.

The relative proportions are 6% mol of Si(OEt)4 for 94% mol of Ti(OiPr)4.

The molar proportion of the mixture of metal alkoxides in the alcohol solution is less than 10%.

The mixture is then hydrolyzed by adding thereto a basic aqueous solution whose pH is equal to 11.5.

An [$H_2O$]/[alkoxides] ratio, i.e. a ratio between the concentration of water and the concentration of alkoxides, of the order of 3 is chosen.

Polymerization due to hydrolysis is immediate and it causes, in that case, the appearance of a suspension of particles of solid polymers. Stirring is effected for about 30 minutes then the suspension is filtered. The precipitate retained on the filter is then dried for 24 hours in an oven at 80° C., then it is heated to 400° C. for 4 hours. The powder obtained is advantageously washed with an ammoniacal solution having a pH=10 then again filtered and dried under the same conditions.

A colloidal suspension is then prepared by mixing the powder with distilled water containing an anionic surface-active agent. The concentration of surface-active agent depends on the quantity of inorganic powder placed in suspension and the proportion of surface-active agent with respect to the inorganic powder is less than 1%. Vigorous stirring takes place for 2 hours. An organic binding agent is then added, for example a polyacrylic acid resin having a molecular weight of 3,000,000 prepared at a rate of concentration of 0.2% by weight.

The proportion of organic binding agent is equal to that of the inorganic powder in the colloidal suspension. Stirring is effected for about 1 hour, after which a very stable suspension is obtained which constitutes a slip which may be applied in very thin layer on a porous ceramic support. If this support has for example the form of a tangential microfiltration cartridge comprising tubular channels which must be internally coated with an ultrafiltration membrane, the channels are filled with slip then left to drain off, with the result that the inner face of each channel finally bears a coating of slip having a thickness of less than 50 microns.

The cartridges are placed in an oven and the temperature is progressively raised to 190° C. at a rate of 1° C./minute. This temperature is maintained for one hour. The temperature is then raised again up to 1150° C. at a rate of 2° C./minute.

The temperature of 1150° C. is maintained for 4 hours and the temperature is progressively lowered to ambient temperature in 10 hours.

Tangential ultrafiltration cartridges are finally obtained whose channels are coated with a membrane of mixed titanium and silicon oxides forming a lattice. This membrane has a thickness of 40 microns, a mean diameter of the open pores, measured with a mercury porosity meter, of 0.3 micron and an open porosity of 20%.

The first process according to the invention which has just been described, comprises the preparation of a submicronic powder of mixed titanium and silicon oxides from which a slip is prepared. This submicronic powder is obtained from the step of hydrolysis of the metal alkoxides when hydrolysis is sufficiently advanced to lead to a suspension of particles of polymers.

A more moderate hydrolysis may also be effected, by adding to the alcoholic solution of metal alkoxides a smaller quantity of basic aqueous solution, such that the ratio between the concentration of water and the concentration of alkoxides is less than 1. In this case, hydrolysis of the alkoxides is incomplete and a liquid is obtained which contains in solution macromolecules of mixed titanium and silicon alkoxide polymers.

This solution contains metal-organic precursors, i.e. copolymers of titanium and silicon alkoxides containing a high proportion of non-hydrolyzed residual alkyl groups.

This solution has well-defined viscosity and characteristics and it may be deposited in thin layer directly on a substrate which is porous or not. By drying, a polymer gel is then obtained which is constituted by a perfectly cross-linked metal-organic lattice. A subsequent heat treatment makes it possible to eliminate the residual alkyl groups after which a membrane is obtained by sintering, composed of mixed titanium and silicon oxides which conserves the cross-linked structure of the metal-organic lattice.

EXAMPLE 2

Deposit on a substrate of an entirely vitrified dense thin layer

A partial hydrolysis is firstly effected of tetra methoxy silane in solution in hexane by adding to said solution a basic aqueous solution having a pH=11.5. The proportion of aqueous solution used corresponds to one mol of water for one mol of tetra methoxy silane.

A partial hydrolysis is thus obtained which may be represented by the following reaction:

$$Si(OMe)_4 + H_2O \rightarrow SiOH(OMe)_3 + MeOH.$$

To the mixture thus hydrolyzed is added tetraisopropoxyorthotitanium $Ti(OiPr)_4$ at a rate of one mol of $Ti(OiPr)_4$ for 4 mols of silicon alkoxide.

Macromolecules of titanium trimethoxysilyloxide are thus obtained in accordance with the following reaction.

$$Ti(OiPr)_4 + 4\ SiOH(OMe)_3 \rightleftharpoons Ti[OSi(OMe)_3]_4 + 4iPrOH.$$

This titanium trimethoxysilyloxide is a precursor which exists in solution in the form of a polymer of which the relatively low degree of polymerization and stability increase with the rate of hydrolsis.

It is therefore advantageous to increase the rate of hydrolysis and to this end, basic aqueous solution with pH=11.5 is added, at a rate of one additional mol of water for one mole of titanium trimethoxysilyloxide which leads to equilibrium:

$$Ti[OSi(OMe)_3]_4 + H_2O \rightleftharpoons [TiO_x(OSiMe)_{4-2x}]_n$$

formula in which n is the degree of polymerization and x the rate of hydrolysis which was attained at equilibrium.

In this way, a solution is obtained to which are added two molecules of a diol, for example 2 methyl-2-4 pentanediol, which is intended to defunctionalize a part of the reactive groups located at the end of the chain which are capable of undergoing a subsequent hydrolysis which is undesirable as it would lead to macromolecules of polymers, therefore to the formation of too large grains.

An organic binding agent, for example 5% by weight of polyethylene glycol, is then added to this solution.

A liquid is thus obtained which may be directly applied in thin layer on a support which is porous or not, then freed of the residual organic groups by a perfectly controlled heat treatment, this making it possible to avoid passing via a powder and a slip.

Heat treatment in an oven of the layer applied on a substrate comprises the following steps:

drying for 48 hours at ambient temperature of the substrate on which the solution has been applied in thin layer, in order to evaporate the solvent;

very slow rise in temperature up to about 200° C. at a rate of 0.1° C. per minute;

plateau of about 4 hours at 200° C.;

second rise in temperature up to about 700° C. at a rate of 0.5° C./minute;

second plateau of 4 hours at 700° C.;

slow lowering to ambient temperature in about 10 hours.

The first rise in temperature up to 200° C. makes it possible to free the solution of the residual alkyl groups. It is the so-called nucleation step after which a layer is obtained composed of a lattice of mixed titanium and silicon oxide molecules joined together to form structures which conserve the architecture of the macromolecules of polymers of titanium polyalkylsilyloxide.

The second rise in temperature corresponds to the phase of sintering.

In this example where the proportion of silicon oxide is high (75%), a dense, vitrified layer having a thickness of 5 microns is obtained after sintering, which serves for example as reverse osmosis membrane.

What is claimed is:

1. A process of manufacturing thin membranes composed of an inorganic lattice of titanium and silicon oxides, consisting of the steps of:
   (a) dissolving in an anhydrous alcohol or in an alkane at least one titanium alkoxide and at least one silicon alkoxide in a determined ratio, so as to obtain molecules of mixed alkoxides of titanium an silicon;
   (b) effecting hydrolysis of said mixed alkoxides by adding to said solution a basic aqueous solution having a pH between 11 and 12 to effect a ratio between the number of molecules of water and the number of molecules of metal present in said alkoxides of between 2 and 4, whereby controlled nucleation occurs, partially hydrolyzed copolymers of titanium and silicon alkoxides are formed, whereby a suspension of particles of partially hydrolyzed copolymers of titanium and silicon alkoxides is obtained;
   (c) filtering said suspension in order to seperate the the precipitate;
   drying the precipitate at a temperature lower than 80° C., in order to obtain a powder;
   (d) slowly heating said powder to a temperature of between 180° and 600° C. in order to eliminate the residual alkyl groups;
   (e) mixing said powder with water containing binding agents and organic surface-active agents in order to form a slip;
   (f) applying a thin layer of said slip on a substrate;
   (g) and heating said layer to a temperature of between 750° and 1250° C., whereby a thin membrane is obtained by sintering, composed of an inorganic lattice of titanium and silicon oxides.

2. A process of manufacturing thin membranes composed of an inorganic lattice of titanium and silicon oxides, consisting of the steps of:
   (a) dissolving in an anhydrous alcohol or in an alkane at least one titanium alkoxide and at least one silicon alkoxide in a determined ratio, so as to obtain molecules of mixed alkoxides of titanium and silicon;
   (b) partially hydrolyzing said solution of titanium and silicon alkoxides by adding thereto such a quanity of basic aqueous solution that the ratio between the number of molecules of water and the number of molecules of metal present in said alkoxides is between 0.5 and 1, whereby a solution of copolymers of titanium and silicon alkoxides is obtained, containing a high proportion of non-hydrolyzed alkyl groups;

applying on a substrate a thin layer of said solution;
   slowly heating to a temperature of between 180° and 600° C. in order to eliminate by evaporation the residual alkyl groups;
   and then heating to a temperature between 750° and 1250° C. whereby a membrane composed of an inorganic lattice of titanium an silicon oxides is obtained by sintering.

3. The process of claim 1, wherein the ratio between the number of mols of silica and the number of mols of titanium oxide is at least equal to 6.

4. The process of claim 2, wherein the ratio between the number of mols of silica and the number of mols of titanium oxide is at least equal to 6.

5. The process of claim 1, wherein said titanium alkoxide is tetraisopropoxyorthotitanate or tetra-ethoxy ortho titanate.

6. The process of claim 2, wherein said titanium alkoxide is tetraisopropoxyorthotitanate or tetra-ethoxy ortho titanate.

7. The process of claim 1, wherein said silicon alkoxide is tetra methoxy silane or tetra ethoxy silane.

8. The process of claim 2, wherein said silicon alkoxide is tetra methoxy silane or tetra ethoxy silane.

9. The process according to claim 1, wherein said substrate is a ceramic filter cartridge for use in filtration, microfiltration, ultrafiltration or reverse osmosis.

10. The process according to claim 2, wherein said substrate is a ceramic filter cartridge for use in filtration, microfiltration, ultrafiltration or reverse osmosis.

* * * * *